(No Model.) 2 Sheets—Sheet 1.
S. SALBERG.
APPARATUS FOR MAKING LAMPBLACK.
No. 486,127. Patented Nov. 15, 1892.
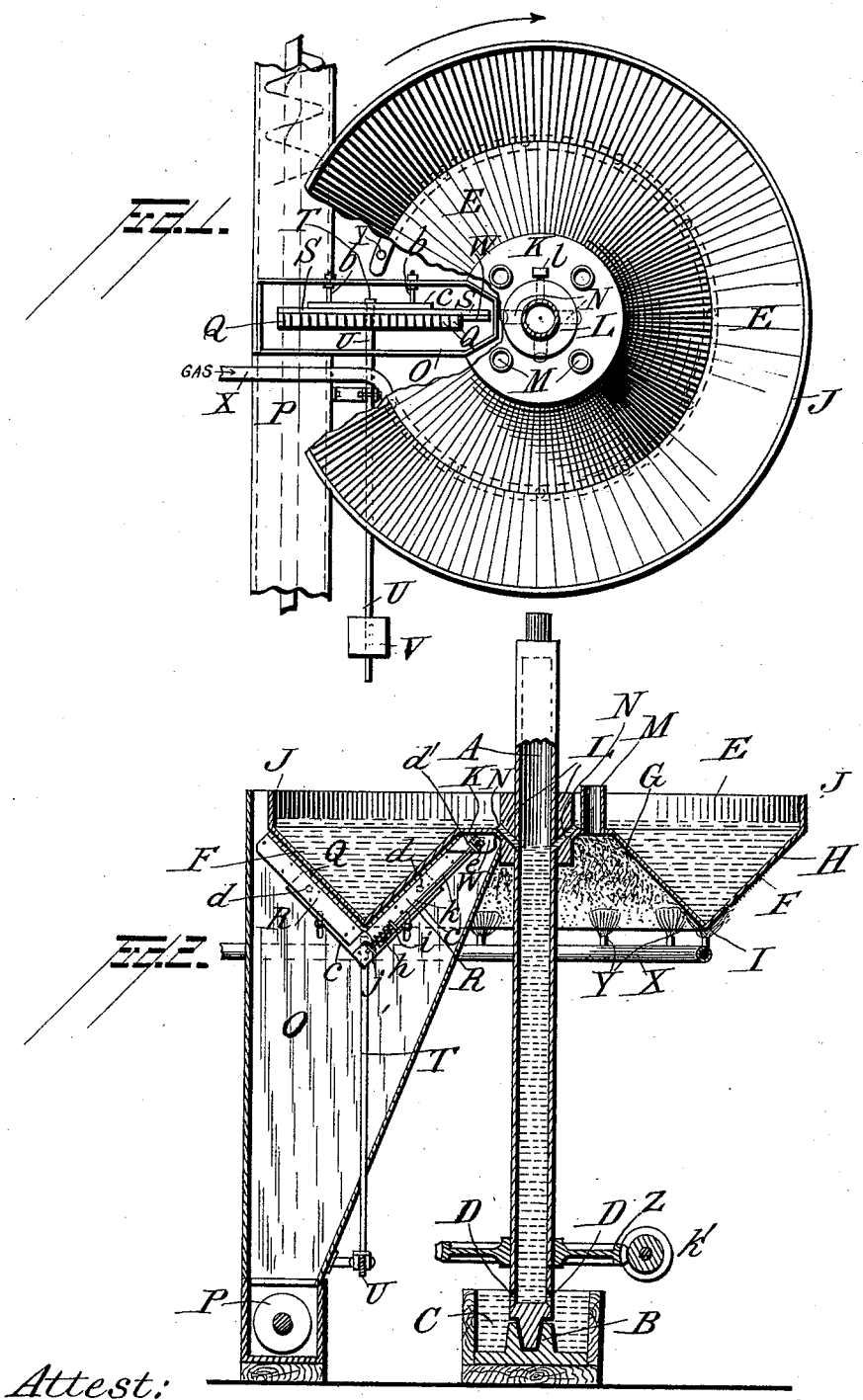
Attest:
F. H. Schott
Alfred T. Gage
Inventor
Swain Salberg
by W. T. Henderson
his Attorney

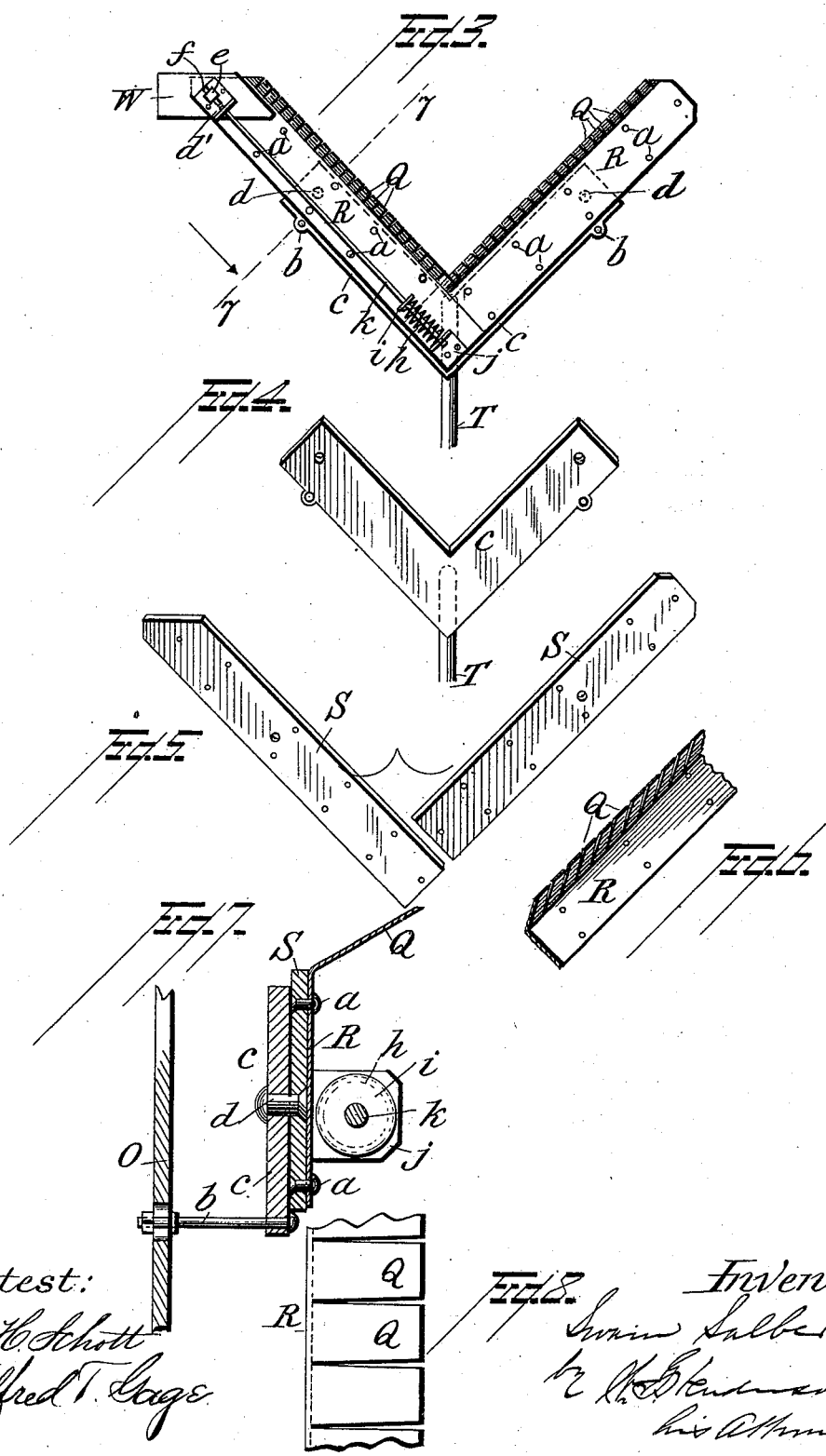

UNITED STATES PATENT OFFICE.

SWAIN SALBERG, OF RIDGWAY, PENNSYLVANIA.

APPARATUS FOR MAKING LAMPBLACK.

SPECIFICATION forming part of Letters Patent No. 486,127, dated November 15, 1892.

Application filed August 2, 1892. Serial No. 441,945. (No model.)

*To all whom it may concern:*

Be it known that I, SWAIN SALBERG, a native of Sweden, having filed my declaration of intention to become a citizen of the United States, residing at Ridgway, in the county of Elk and State of Pennsylvania, have invented certain new and useful Improvements in Apparatus for Making Lampblack; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to apparatus for making lampblack, and has for its objects to simplify and improve the construction whereby the maximum of surface is exposed to the flame in the minimum of space and the production of the lampblack greatly facilitated and expedited; also, to provide a scraper designed to remove the lampblack from the surface on which it is formed in order that it may be directed through a spout or chute to a conveyer by which it is conducted to the point of final delivery.

To the accomplishment of the foregoing and such other objects as may hereinafter appear the invention consists in the construction and the combination of parts hereinafter particularly described, and then sought to be clearly defined by the claims.

Figure 1 is a plan of the apparatus partly broken away. Fig. 2 is a vertical section. Fig. 3 is a side view of the scraper; Fig. 4, a side view of a portion of the scraper. Fig. 5 is a side view of the plates to which the sheet-metal portion of the scraper is attached; Fig. 6, a perspective of a sheet-metal portion of the scraper; Fig. 7, a vertical section through the scraper, and Fig. 8 an enlarged plan of the slitted portion of the scraper.

In the drawings the letter A designates an upright hollow shaft bearing at its lower end in a step B, which preferably is located within a trough or water-receptacle C, the lower end of the shaft being provided with any desired number of apertures D for the passage of water from the interior of the shaft into the water-tank C, from which it may be conducted to any desired point. To the upper portion of the shaft A there is secured a pan or receptacle E, designed to contain water which may be delivered thereto from any suitable source for the purpose of keeping cool the bottom of the pan or receptacle which constitutes the surface on which the lampblack is formed. This pan or receptacle is circular in form and made with a V-shaped bottom F, so as to form two diverging surfaces or faces G and H on both of which the lampblack will be formed or deposited by directing the flame from the burner against the lower or meeting point I of the two surfaces, thus causing the flame to divide so that part will follow one surface and the other part the other surface, and thus cause the black to form or settle on both surfaces from the single flame. It will be observed that this V-shaped bottom is circular, so that the same extent of surface is presented at all points to the flame as the pan is revolved over the burners, which construction also allows of the application of scrapers to the best advantage, so as to remove the carbon or lampblack from both surfaces at the same time as the pan is revolved. The outside edge of the pan forms a flange J, extending vertically above the upper end of the inclined face H, and that portion of the bottom of the pan at the upper end of the inside inclined face G extends horizontally inwardly, as shown at K, and is joined to the hub L of the pan, as indicated in the drawings. This inwardly-extending portion K of the bottom forms the top of the dome-shaped space around the shaft, and from the portion K there extends upwardly any desired number of tubes M, which constitute escape-flues for the products of combustion from the dome-shaped space around the shaft and also additional surfaces on which the lampblack may be deposited from the combustion products. Through the hub L, on about a line with the top of the portion K, there are formed any desired number of passages or channels N, which effect a communication between the water-space of the pan and the interior of the hollow shaft A, so that so long as the pan contains water to that level the water will flow from the pan through said channels into the hollow shaft and discharge therefrom into the water-trough C at the base of the shaft, thus effecting a continuous change of the water in the pan so long as water is delivered to the pan. In this way the water which becomes heated from contact with the bottom of the pan is continuously replaced by cold water, so that the heat of the bottom of the pan is kept down and a greater deposit of lampblack insured.

At some suitable point in the rotation of the pan there is arranged a spout or chute O, extending from the hub of the pan to the outer circumference of the pan, so that at such point the carbon or black may be scraped from the bottom of the pan and by the chute conducted to the conveyer P, of any approved construction, from whence it will be delivered to the point or receptacle desired. The inside wall of the chute O is preferably made inclined, as shown, so as to direct the carbon to the conveyer.

Within the chute O is arranged a scraper for the purpose of removing the carbon from the bottom of the pan. The best construction of scraper for most effectually removing the black is made of sheet metal or elastic fingers Q, made by slitting a sheet or strip of metal, so that they will yield to any irregularity or unevenness in the surface to be scraped.

The form of scraper which I have illustrated in the drawings is composed of sheet-metal plates or strips R, attached by rivets $a$ or otherwise to stiffening-base plates S, which are disconnected at their junction, so as to be free to be turned or moved independently of each other, and the strips R are bent obliquely, as illustrated, the obliquely-bent portion being slitted, so as to form the elastic fingers Q. These plates S each are pivoted by a pin $d$ to one arm of the plate $c$, preferably made V-shaped, as shown, so as to form two arms, which plate will be connected by bolts or rods $b$ with one side wall of the chute O, so as to steady the scraper, the connection between the rods and the wall or plate being such that the plate may be raised or lowered in the lifting and dropping of the scraper, of which said plate may be said to constitute a part. This scraper is made or arranged so as to be V-shaped in form, in order to bear against the two inclined faces G and H of the V-shaped bottom to the pan. The scraper is supported by means of the rod T, which extends from the plate $c$ through the inclined wall of the chute O and connects at its lower end with a lever U, fulcrumed at some suitable point, and having an adjustable weight V at its outer end, so that by adjusting said weight the scraper will be caused to bear with more or less pressure against the inclined or V-shaped bottom of the pan. This manner of supporting the scraper affords a yielding support therefor, so that the disadvantages of a rigid or unyielding bearing of the scraper against the pan are obviated.

For the purpose of removing the lampblack which may form on the bottom of the portion K of the pan, I provide a scraper W, which is connected in some suitable manner with the main scraper, so as to be supported with it by the rod and lever previously described. As one manner of connecting this scraper W to the main scraper, I have shown an angular plate $d'$, connected to the scraper W, and a headed bolt $e$, passed through a slot $f$, made in the plate $d'$ and scraper, so that the scraper W will be free to rise and fall in order not to bear rigidly against the surface which it is intended to scrape. To give this scraper W a yielding or elastic bearing against the surface to be scraped I connect a rod $k$ to the plate $d'$ and coil a spring $h$ around the rod and cause one end of it to bear against a collar $i$ on the rod and the other end against a plate $j$, attached to the main scraper, through which plate the end of the rod $k$ will be free to move. In this way the spring $h$ is caused to hold the scraper W with a yielding or elastic pressure against the surface to be scraped, the spring allowing the scraper to yield to any inequalities in the surface being scraped. If gas is used as the material from which to form the carbon or lampblack it is delivered from its source of supply to the burner-pipe X, which is located and curved so as to lie directly under the lowest point of the pan or the point of divergence of the two inclined faces G and H of the pan, at which point at suitable intervals the pipe is provided with nipples Y, so that the flame from the nipples will be directed against the bottom of the pan in such manner as to be divided, so that one portion will follow the face H and the other portion the face G of the pan and thus cause the carbon or black to form on both of said faces.

The hollow upright shaft A will be provided with the gear-wheel Z, with which will mesh the pinion or worm-gear $k'$, so that the shaft will be rotated, and the pan, which is keyed or secured thereto by bolts $l$ or otherwise, will revolve therewith. Any desired number of these pans may be arranged side by side and their upright shafts connected together, so that they can all be operated from the same power-transmitting shaft.

I have described with particularity and in detail the construction of the several parts which I have found to be best adapted for most efficiently and expeditiously producing the lampblack and removing the same from the pan; but I do not mean to restrict myself to such exact details as it is obvious that changes can be made therein without departing from the essential features of my invention.

Having described my invention and set forth its merits, what I claim is—

1. In an apparatus for making lampblack, the combination, with the hollow shaft, of the rotatable pan formed with a V-shaped bottom and having communication with the interior of said shaft for the passage of water to the shaft and the burner located beneath the pan at a point to direct the flame or products of combustion against the two oppositely-inclined faces of the bottom, substantially as and for the purposes described.

2. In an apparatus for making lampblack, the combination, with the hollow shaft, of the rotatable pan having communication with the interior of said shaft, formed with a V-shaped bottom and an inwardly-extending horizontal portion from the inner inclined wall of the bottom, and a burner located beneath the pan at a point to direct the flame or products of combustion against the two oppositely-inclined faces of the bottom, substantially as and for the purposes described.

3. In an apparatus for making lampblack, the combination, with the hollow shaft, of the rotatable pan having communication with the interior of said shaft for the passage of water from the pan to the shaft and formed with a V-shaped bottom, tubes extending upwardly from the space bounded by the inner inclined wall of the bottom, and a burner located beneath the pan at a point to direct the flame or products of combustion against the two oppositely-inclined faces of the bottom, substantially as and for the purposes described.

4. In an apparatus for making lampblack, the combination, with the rotatable pan and a burner located beneath the bottom of the pan, of a scraper located adjacent to the bottom to bear against the same, a rod connected with said scraper, and an adjustably-weighted lever to which said rod is connected for supporting said scraper, substantially as and for the purposes described.

5. In an apparatus for making lampblack, the combination, with the rotatable pan formed with a V-shaped bottom and a burner located beneath said bottom, of a V-shaped scraper supported beneath the pan so that its two members will bear against the oppositely-inclined faces of the bottom of the pan to remove lampblack therefrom, substantially as and for the purposes described.

6. In an apparatus for making lampblack, the combination, with the rotatable pan formed with a V-shaped bottom and having a portion extending horizontally inwardly from the inner wall of said bottom and a burner located beneath said bottom, of a V-shaped scraper supported to bear against the oppositely-inclined walls of the bottom of the pan and a yielding scraper connected with said V-shaped scraper and bearing against the horizontally-extending portion to the bottom of the pan, substantially as and for the purposes described.

SWAIN SALBERG.

Witnesses:
GEO. A. RATHBUN,
JOE D. SCRIBNER.